April 7, 1964  A. C. FERGUSON  3,127,634
FISH SCALER
Filed July 3, 1962
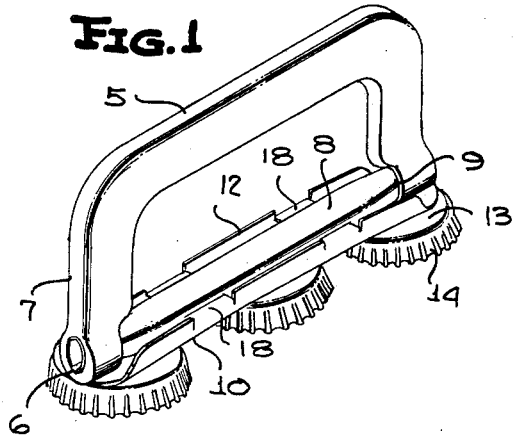
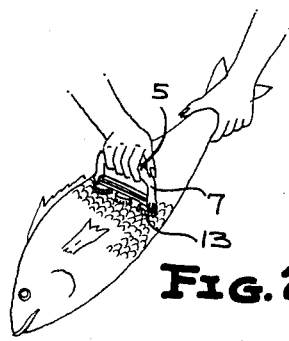
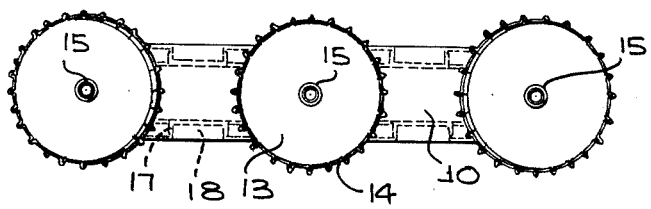
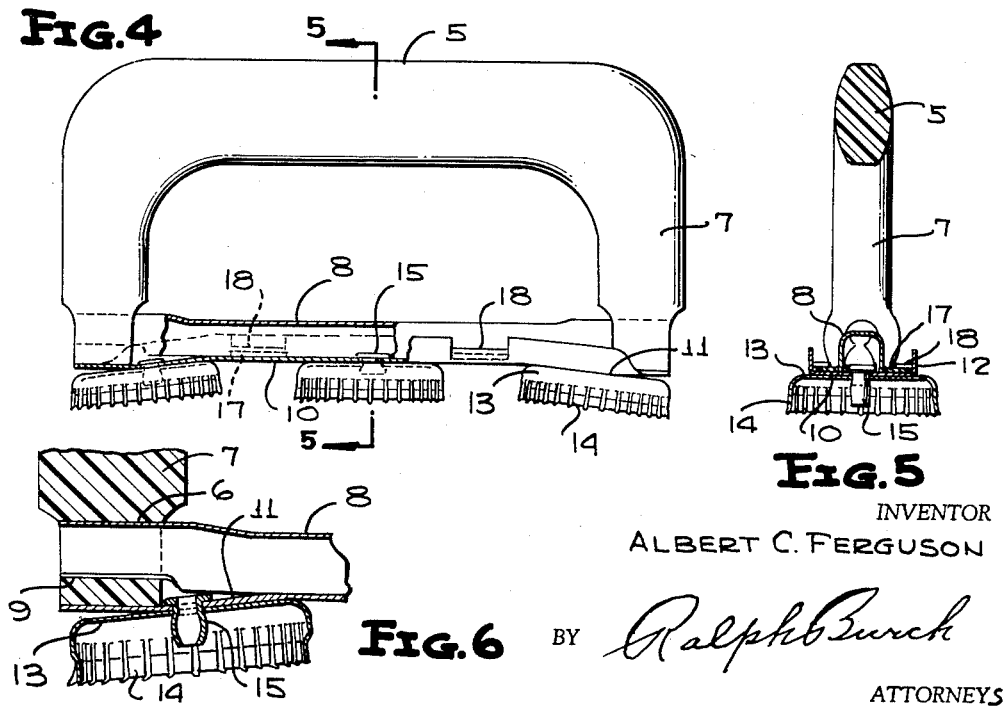
INVENTOR
ALBERT C. FERGUSON
BY Ralph Burch
ATTORNEYS

3,127,634
FISH SCALER
Albert C. Ferguson, P.O. Box 6271, Jacksonville, Fla.
Filed July 3, 1962, Ser. No. 207,261
3 Claims. (Cl. 17—7)

This invention relates to an improved fish scaler which may be employed by both men or women to efficiently remove the scales of a fish and which requires a minimum amount of pressure.

It is an object of the invention to provide a scaler having a series of scrapers supported by a handle disposed above the scrapers whereby an equal pressure may be applied to all the scrapers.

A further object of the invention resides in providing a scaler having a series of spaced scrapers disposed beneath and longitudinally of the handle with the end scrapers disposed at an angle to conform to the curvature of the fish being scaled.

Other objects and advantages of the invention will be apparent during the course of the following description.

In the accompanying drawing forming a part of this specification and in which like numerals are employed to designate like parts throughout the same:

FIG. 1 is a perspective view of the scaler,

FIG. 2 is a view on a reduced scale showing the scaler in use,

FIG. 3 is a bottom view of the scaler,

FIG. 4 is a side view of the scaler,

FIG. 5 is a section taken on line 5—5 of FIG. 4, and,

FIG. 6 is an enlarged sectional view of one of the end scrapers.

Referring to the drawing wherein for the purpose of illustration a preferred embodiment of the invention is shown the numeral 5 denotes a U-shape handle having alined transverse oval shaped openings 6 formed in the terminals of the legs 7. An inverted U-shaped bar 8 extends between the legs 7 of the handle having reduced ends 9 extending through the openings 6 and tightly fitted therein to rigidly secure the bar in place. The side walls of bar 8 are bent outwardly to form laterally extending flanges 17. A plate 10 extends longitudinally of the bar 8 covering the channel of the bar with portions adjacent the ends of the plate bent downwardly at a slight angle, as at 11, with the ends disposed beneath the ends of the legs 7 of the handle. The plate 10 is wider than the bar 8 and has upturned flanges 12 along its longitudinal edges which at spaced intervals are cut to provide tabs 18 which are folded over the flange 17 of bar 8 to secure the plate and bar together. A series of scrapers 13 is secured to the underside of plate 10 in spaced apart relation with the end scrapers disposed beneath the inclined ends of the plate so that they are angularly disposed with respect to the intermediate scraper. The scrapers shown are conventional bottle caps having serrated flanges 14 and each scraper is attached to the plate 10 by a central rivet 15.

In use, the handle 5 is gripped by the hand, as shown in FIG. 2 with the scrapers 13 in contact with the body of the fish and upon reciprocation of the handle the serrated flanges of the scrapers lift and remove the scales. With the handle disposed above the scrapers pressure applied to the handle will be equally distributed over all the scrapers. As the end scrapers are disposed at a slight angle they will conform to the curvature of the body of the fish being scaled thus insuring that the scraper will reach all parts of the fish so as to thoroughly remove all the scales. The disposition of the handle and arrangement of the scrapers makes the physical effort of cleaning a fish much easier so that it is particularly desirable for use by women.

It is to be understood that the form of the invention herein shown and described is a preferred example of the same and changes in the shape, size and arrangement of the parts may be made without departing from the spirit of the invention or scope of the claims.

Having thus described my invention, I claim:

1. A fish scaler comprising an elongated bar, a U-shape handle having alined transverse openings in the terminals of its legs to receive the ends of said bar, an elongated plate extending longitudinally of said bar and secured thereto, portions of said plate adjacent each end being inclined downwardly with said ends of the plate disposed beneath and in abutting engagement with the terminals of the legs of said handle, and a series of scraper disks attached to the underside of said plate with a disk attached to each inclined portion of the plate.

2. A fish scaler comprising a U-shape handle having transverse alined openings in the terminals of its legs, an inverted U-shape bar extending between the legs of said handle with the ends of said bar fitted in the openings in the terminals of said legs, said bar having outwardly extending lateral flanges along its lower edges, an elongated plate extending the length of said bar having upturned flanges along the longitudinal edges of said plate, said flanges having tabs adapted to be bent over the flanges of said bar and a series of scraper disks attached to the underside of said plate in spaced apart relation.

3. A fish scaler comprising a handle consisting of a bar having depending legs at each end provided with alined apertures in the ends of said legs, an elongated bar extending between the legs of said handle and fixedly mounted in the apertures of said legs, an elongated plate extending longitudinally of said elongated bar and fixedly secured to the bottom thereof, portions of said plate adjacent each end being inclined downwardly at an angle to the longitudinal axis of said elongated bar in the direction of the legs of said handle and a series of bottle caps having serrated flanges secured to the bottom face of said plate in spaced relation with a cap attached to each inclined portion of the plate.

References Cited in the file of this patent

UNITED STATES PATENTS

| 1,281,200 | Perry | Oct. 8, 1918 |
| 2,396,388 | Reenstierna | Mar. 12, 1946 |

FOREIGN PATENTS

| 486,253 | Germany | Nov. 14, 1929 |
| 247,966 | Switzerland | Jan. 3, 1948 |